(12) United States Patent
Goldenberg et al.

(10) Patent No.: US 8,570,865 B2
(45) Date of Patent: Oct. 29, 2013

(54) REDUCING POWER CONSUMPTION IN A FAT-TREE NETWORK

(75) Inventors: Dror Goldenberg, Zichron Yaakov (IL); Eitan Zahavi, Zichron Yaakov (IL); Ori Rottenstreich, Kiriat Motzkin (IL)

(73) Assignee: Mellanox Technologies Ltd., Yokneam (IL)

( * ) Notice: Subject to any disclaimer, the term of this patent is extended or adjusted under 35 U.S.C. 154(b) by 418 days.

(21) Appl. No.: 13/026,309

(22) Filed: Feb. 14, 2011

(65) Prior Publication Data

US 2012/0207018 A1    Aug. 16, 2012

(51) Int. Cl.
*H04J 1/16*    (2006.01)

(52) U.S. Cl.
USPC ...................................................... 370/230

(58) Field of Classification Search
USPC ......... 370/230, 229, 235, 253, 338, 388, 390, 370/392, 399, 389, 256, 277; 398/45, 48
See application file for complete search history.

(56) References Cited

U.S. PATENT DOCUMENTS

| | | |
|---|---|---|
| 6,442,174 B1 | 8/2002 | Lin |
| 6,791,942 B2 | 9/2004 | Jin |
| 6,947,776 B2 | 9/2005 | Vollmer et al. |
| 7,389,046 B1 * | 6/2008 | Tanaka et al. .................. 398/45 |
| 7,584,375 B2 | 9/2009 | Gutman et al. |
| 7,599,284 B1 | 10/2009 | Di Benedetto et al. |
| 7,848,264 B1 | 12/2010 | Gai et al. |
| 8,406,128 B1 * | 3/2013 | Brar et al. ..................... 370/229 |
| 2008/0219268 A1 | 9/2008 | Dennison |
| 2010/0265849 A1 | 10/2010 | Harel |

OTHER PUBLICATIONS

Irwing, R., "An Efficient Algorithm for the "Stable Roommates" Problem", Journal of Algorithms, vol. 6, issue 4, pp. 577-595, Dec. 1985.

Leiserson, C., "Fat-trees: Universal Networks for Hardware Efficient Supercomputing", IEEE Transactions on Computers, vol. c-34, No. 10, pp. 892-901, Oct. 1985.

Chiaraviglio et al., "Energy-aware Backbone Networks: a Case Study", Proceedings of Green Communications Workshop in conjunction with IEEE ICC'09 (GreenComm09), Dresden, Germany, Jun. 2009.

Chiaraviglio et al., "Energy-Aware UMTS Core Network Design", Proceedings of 1st International Workshop on Green Wireless (WGREEN 2008) in conjunction with WPMC, Lapland, Finland, Sep. 2008.

Chiaraviglio et al., "Reducing Power Consumption in Backbone Networks", Proceedings of 2009 IEEE International Conference on Communications (ICC 2009), Dresden, Germany, Jun. 2009.

(Continued)

*Primary Examiner* — Chi Pham
*Assistant Examiner* — Alexander O Boakye
(74) *Attorney, Agent, or Firm* — D. Kligler I.P. Services Ltd.

(57) ABSTRACT

A method for communication includes estimating a characteristic of communication traffic to be carried by a fat-tree network. Responsively to the estimated characteristic, a subset of the spine switches in the highest level of the network is selected, according to a predetermined selection order, to be active in carrying the communication traffic. In each of the levels of the spine switches below the highest level, the spine switches to be active are selected based on the selected spine switches in a next-higher level. The network is operated so as to convey the traffic between the leaf switches via the active spine switches, while the spine switches that are not selected remain inactive.

32 Claims, 5 Drawing Sheets

(56) References Cited

OTHER PUBLICATIONS

Ohring et al., "On Generalized Fat Trees", Proceedings of the 9th International Parallel Processing Symposium, pp. 37-44, Santa Barbara, Apr. 25-28, 1995.

Restrepo et al., "Energy Profile Aware Routing", Proceedings of Green Communications Workshop in conjunction with IEEE ICC'09 (GreenComm09), Dresden, Germany, Jun. 2009.

Tucker et al., "Energy Consumption in IP Networks", Proceedings of 34th European Conference & Exhibition On Optical Common, (ECOC 2008), vol. 2-73, Brussels, Belgium, Sep. 21-25, 2008.

Zahavi, E., "D-Mod-K Routing Providing Non-Blocking Traffic for Shift Permutations on Real Life Fat Trees", CCIT Technical Report # 776, Technion—Israel Institute of Technology, Haifa, Israel, Aug. 16, 2010.

Clos, Charles, "A Study of Non-Blocking Switching Networks", Bell System Technical Journal 32, pp. 406-424, Mar. 1953.

Mellanox Technologies Inc., "Scaling 10Gb/s Clustering at Wire-Speed", Santa Clara, California, USA 2006.

IEEE 802.1D Standard "IEEE Standard for Local and Metropolitan Area Networks—Media Access Control (MAC) Bridges", IEEE Computer Society, USA, Jun. 9, 2004.

IEEE 802.1AX Standard "IEEE Standard for Local and Metropolitan Area Networks—Link Aggregation", IEEE Computer Society, USA, Nov. 3, 2008.

Turner et al., "Multirate Clos Networks", IEEE Communications Magazine, Oct. 2003.

Thayer School of Engineering, "An Slightly Edited Local Elements of Lectures 4 and 5", Dartmouth College, Jan. 15, 1998 http://people.seas.harvard.edu/~jones/cscie129/nu_lectures/lecture11/switching/clos_network/clos_network.html.

U.S. Appl. No. 12/426,970 Official Action dated Jan. 5, 2011.

\* cited by examiner

REDUCING POWER CONSUMPTION IN A FAT-TREE NETWORK

FIELD OF THE INVENTION

The present invention relates generally to data communication networks, and specifically to methods and apparatus for reducing power consumption in such networks.

BACKGROUND OF THE INVENTION

Various methods are known in the art for reducing the power consumption of a communication link or network by reducing unneeded data capacity. For example, U.S. Pat. No. 6,791,942, whose disclosure is incorporated herein by reference, describes a method for reducing power consumption of a communications interface between a network and a processor. The method monitors data traffic from the sides of the interface. Upon detecting a predetermined period of no data traffic on both sides, the method disables an auto-negotiation mode of the interface and forces the interface to operate at its lowest speed.

As another example, U.S. Pat. No. 7,584,375, whose disclosure is incorporated herein by reference, describes a distributed power management system for a bus architecture or similar communications network. The system supports multiple low power states and defines entry and exit procedures for maximizing energy savings and communication speed.

Chiaraviglio et al. analyze another sort of approach in "Reducing Power Consumption in Backbone Networks," *Proceedings of the 2009 IEEE International Conference on Communications* (ICC 2009, Dresden, Germany, June, 2009), which is incorporated herein by reference. The authors propose an approach in which certain network nodes and links are switched off while still guaranteeing full connectivity and maximum link utilization, based on heuristic algorithms. They report simulation results showing that it is possible to reduce the number of links and nodes currently used by up to 30% and 50%, respectively, during off-peak hours while offering the same service quality.

SUMMARY

Embodiments of the present invention that are described below provide techniques for reducing power consumption in communication networks based on traffic requirements, as well as networks implementing such techniques.

There is therefore provided, in accordance with an embodiment of the present invention, a method for communication, which includes estimating a characteristic of communication traffic to be carried by a fat-tree network, which includes leaf switches interconnected by links with spine switches arranged in multiple levels, culminating in a highest level. Responsively to the estimated characteristic, a subset of the spine switches in the highest level is selected, according to a predetermined selection order, to be active in carrying the communication traffic. In each of the levels of the spine switches below the highest level, the spine switches to be active are selected based on the selected spine switches in a next-higher level. The network is operated so as to convey the traffic between the leaf switches via the active spine switches, while the spine switches that are not selected remain inactive.

In a disclosed embodiment, the selection order is determined so as to maximize a number of the spine switches in intermediate levels of the network that can be inactivated while still maintaining full connectivity between the leaf switches.

In some embodiments, the network is a k-ary n-tree network, and the selection order is determined such that the spine switches in the highest level that connect to a common spine switch in an intermediate level of the network are activated and deactivated in immediate succession. The spine switches may be identified by respective indices, and the selection order may be expressed as a mathematical progression over the indices.

In some embodiments, estimating the characteristic of the communication traffic includes scheduling computing jobs to be carried out by computing nodes connected to the leaf switches, and estimating characteristics of the communication traffic due to each of the computing jobs. Typically, scheduling the jobs includes determining the scheduling responsively to the selection order so as to reduce a power consumption of the network.

Alternatively or additionally, estimating the characteristic of the communication traffic includes measuring a volume of the communication traffic carried by the network, and selecting the subset of the spine switches includes comparing the measured volume to a predetermined threshold in order to decide how many of the spine switches should be active.

Further additionally or alternatively, estimating the characteristic of the communication traffic includes detecting a change in the characteristic of the communication traffic, and operating the network includes changing an activity state of at least one of the spine switches responsively to the change. Operating the network may include modifying a local routing of the communication traffic in a vicinity of the at least one of the spine switches responsively to the change. Additionally or alternatively, operating the network may include transmitting messages among the switches so as to modify a routing of the communication traffic with respect to the at least one of the spine switches prior to changing the activity state.

There is also provided, in accordance with an embodiment of the present invention, a method for communication, including receiving computing jobs that are to be executed by a system that includes a plurality of computing nodes connected to leaf switches of a fat-tree network, in which the leaf switches are interconnected by links with spine switches. The jobs are scheduled to run on respective groups of the computing nodes, wherein the groups are selected so as to enable one or more of the spine switches to be deactivated during execution of at least one of the jobs. The jobs are executed on the respective groups of the computing nodes while deactivating the one or more of the spine switches in accordance with the scheduling.

In a disclosed embodiment, scheduling the jobs includes selecting the groups so that two or more of the jobs run concurrently on different groups of the computing nodes, and the spine switches interconnecting the different groups can be deactivated during the execution of the two or more of the jobs.

Additionally or alternatively, scheduling the jobs includes estimating expected mutual traffic between pairs of the leaf switches due to the jobs, and positioning the leaf switches in the fat-tree network responsively to the mutual traffic. Typically, positioning the leaf switches includes assigning the pairs of the leaf switches that have high mutual traffic to adjacent positions in the fat-tree network.

Further additionally or alternatively, scheduling the jobs includes assigning the computing jobs to run during respective epochs, wherein the epochs and the groups of the computing nodes are chosen so as to reduce an overall power consumption of the network due to the spine switches that are active. Assigning the computing jobs may include optimizing an objective function that depends on the overall power consumption and on delays incurred in running the jobs.

There is additionally provided, in accordance with an embodiment of the present invention, a method for communication, including configuring a multi-level fat-tree network to include at least three levels of switches, including multiple modules arranged externally in a tree topology. Each module contains a respective group of the switches arranged in an internal tree extending over at least two of the levels of the network. A subset of the modules is selected to be active in carrying the communication traffic. The network is operated so as to convey communication traffic among the switches via the active modules, while the modules that are not in the selected subset remain inactive.

In one embodiment, the method includes selecting within at least one of the active modules a sub-group of the switches to be active, while the switches that are not in the selected sub-group within the at least one of the active modules remain inactive.

In another embodiment, the multi-level fat-tree network includes at least first, second, third and fourth levels of the switches, and the multiple modules includes lower-level modules including respective lower-level groups of the switches in at least the first and second levels and upper-level modules including respective upper-level groups of the switches in at least the third and fourth levels.

There is further provided, in accordance with an embodiment of the present invention, communication apparatus, including a plurality of switches, which include leaf switches and spine switches arranged in a fat-tree network, such that the leaf switches are interconnected by links with the spine switches arranged in multiple levels, culminating in a highest level. A network manager is configured to select, according to a predetermined selection order and responsively to an estimated characteristic of communication traffic to be carried by the network, a subset of the spine switches in the highest level to be active in carrying the communication traffic, and in each of the levels of the spine switches below the highest level, to select the spine switches to be active based on the selected spine switches in a next-higher level, so as to cause the network to operate so as to convey the traffic between the leaf switches via the active spine switches, while the spine switches that are not selected remain inactive.

There is moreover provided, in accordance with an embodiment of the present invention, communication apparatus including a computing system, which includes a fat-tree network, including leaf switches and spine switches interconnected by links, and a plurality of computing nodes connected to the leaf switches. A network manager is configured to receive computing jobs that are to be executed by the computing system and to schedule the jobs to run on respective groups of the computing nodes. The groups are selected so as to enable one or more of the spine switches to be deactivated during execution of at least one of the jobs, and to cause the jobs to be executed on the respective groups of the computing nodes as scheduled while deactivating the one or more of the spine switches.

There is furthermore provided, in accordance with an embodiment of the present invention, apparatus for communication, including a plurality of switches arranged in a multi-level fat-tree network including at least three levels of the switches, including multiple modules arranged externally in a tree topology. Each module contains a respective group of the switches arranged in an internal tree extending over at least two of the levels of the network. A network manager is configured to select a subset of the modules to be active in carrying the communication traffic, so as to cause the network to convey communication traffic among the switches via the active modules, while the modules that are not in the selected subset remain inactive.

The present invention will be more fully understood from the following detailed description of the embodiments thereof, taken together with the drawings in which:

DETAILED DESCRIPTION OF EMBODIMENTS

Overview

Figure 1:
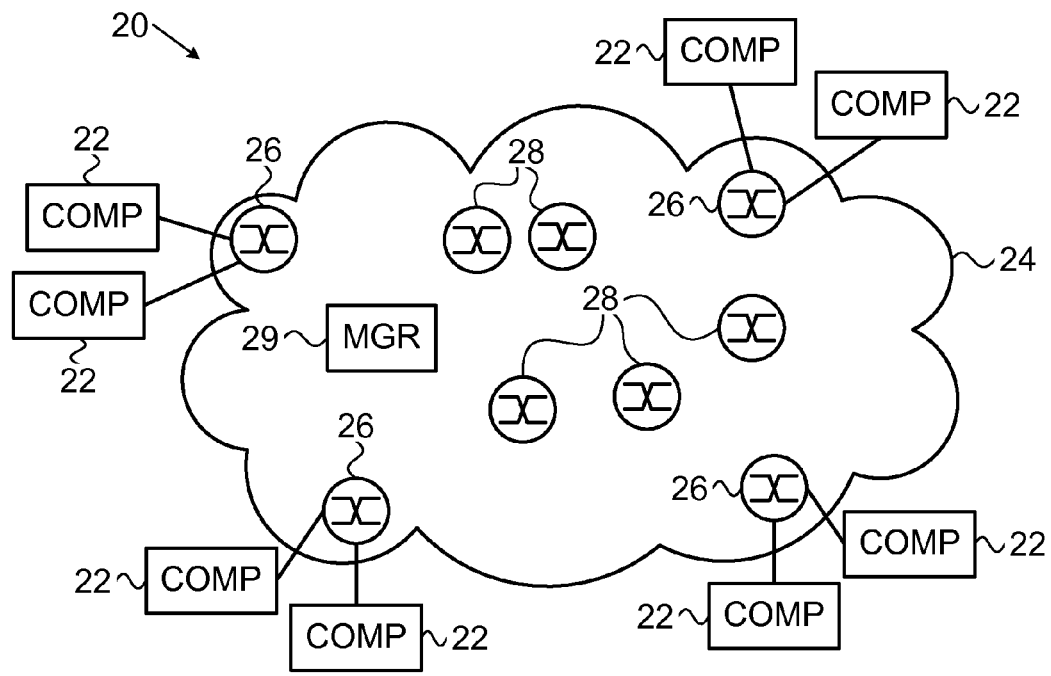
FIG. 1 is a block diagram that schematically illustrates a computing system, in accordance with an embodiment of the present invention.

Various techniques are known in the art for reducing the power consumption of a communication network when traffic is low. Most of these techniques work by powering down links between nodes of the network, either by reducing the data rates of the links or by turning them off altogether. Even when links are turned off, however, the nodes (typically switches) at the ends of the links continue to operate and consume power, thus limiting the overall power savings that can be achieved.

Embodiments of the present invention provide methods and systems in which greater power savings are achieved by deactivating switches in a network when traffic conditions permit. The term "deactivating," as used in the context of the present patent application and in the claims, means that the switches in question are not used to switch data during a given period of time, and can therefore be powered down (i.e., held in a low-power "sleep" state or powered off entirely). The embodiments that are described hereinbelow take advantage of specific features of the network topology and/or scheduling of network use in order to choose the switches that are to be activated and deactivated in a way that maximizes the number of switches that can be deactivated under given traffic conditions, and thus tends to minimize power consumption.

Some embodiments of the present invention are directed to reducing power consumption in fat-tree networks. Such networks, which were originally defined by Leiserson in "Fat-Trees: Universal Networks for Hardware Efficient Supercomputing," IEEE Transactions on Computers C-34(10), pages 892-901 (1985), are now widely used in parallel and distributed computing architectures. In a fat-tree network, computing nodes are connected to leaf switches at the edge of the network, and the leaf switches are interconnected by links to spine switches arranged in multiple hierarchical levels inside the network. The numbers of spine switches and links at each level are chosen so as to provide sufficient bandwidth between the spine switches to enable multiple computing nodes (or all of the computing nodes) to exchange messages via the network concurrently. The term "fat-tree" is used broadly in the art to define any and all types of communication networks meeting the above criteria and includes extended and generalized types of fat trees, as described, for example, by Öhring, et al., in "On Generalized Fat Trees," *Proceedings of the 9$^{th}$ International Symposium on Parallel Processing* (1995), page 37; and by Zahavi, in "D-Mod-K Routing Providing Non-Blocking Traffic for Shift Permutations on Real Life Fat Trees," CCIT Technical Report #776 (Technion—Israel Institute of Technology, Haifa, Israel August, 2010). Both of these publications are incorporated herein by reference.

In some embodiments of the present invention, a network manager estimates a characteristic or characteristics of the communication traffic that is to be carried by a fat-tree network. The term "network manager" is used, in the context of the present patent application and in the claims, to refer to a functional entity (which may be a centralized or distributed function), rather than to a specific physical entity, and for the sake of convenience in the following description refers collectively to all of node- and link-control functions that are associated with the network. The characteristic typically relates to the volume of the traffic and the bandwidth required to carry the traffic, which may include either the aggregate bandwidth or the specific bandwidth required between various pairs of computing nodes (or both aggregate and specific bandwidth requirements). Additionally or alternatively, other characteristics, such as scheduling and routing considerations. The estimated characteristics may be based, for example, on the current traffic level and/or on scheduling of computing jobs to be carried out by computing nodes that are connected to the network.

Based on the estimated traffic characteristics, the network manager selects a subset of the spine switches in the highest level of the network that will be active in carrying the communication traffic. In each of the levels of the spine switches below the highest level, the network manager selects the spine switches that are to be active based on the selected spine switches in the next-higher level. Traffic is then routed through the network in operation so as to convey the traffic between the leaf switches via the active spine switches only. The remaining spine switches may be deactivated.

The selection of the highest-level spine switches may be made according to a predetermined selection order. This order is typically chosen so as to maximize the number of the spine switches in the intermediate levels that can be deactivated for a given number of active highest-level switches, while still providing full connectivity to all of the leaf switches (or at least to all of the leaf switches serving active computing nodes). A particular algorithm for performing this sort of switch selection in a k-ary n-tree type of fat-tree network is described in detail hereinbelow, but the principles of this embodiment may readily be extended to fat-tree networks of other types.

In some embodiments of the present invention, the network manager (in the broad sense defined above) coordinates the selection of the spine switches that are to be active with the timing and choice of computing nodes that are to be used in executing various computing jobs. The manager schedules the jobs to run on respective groups of the computing nodes, while selecting the groups so as to enable one or more of the spine switches to be deactivated during execution of at least one of the jobs. (For example, jobs may be localized among neighboring computing nodes, which communicate via middle-level spine switches, thus permitting at least one of the highest-level spine switches to be deactivated.) In other words, the manager uses the flexibility that may be available in job scheduling as a tool in reducing network power consumption. When the jobs are then executed on the scheduled groups of the computing nodes, the manager deactivates the spine switches that are not needed according to the scheduling.

This sort of scheduling-based switch selection can be used in conjunction with other factors for choosing switches to deactivate. For example, when the scheduled jobs are not communication-intensive, it may be possible to deactivate further spine switches using the traffic-based techniques mentioned above.

System Description

FIG. 1 is a block diagram that schematically illustrates a computing system 20, in accordance with an embodiment of the present invention. System 20 comprises multiple computing nodes 22, each of which typically comprises one or more processors with local memory and a communication interface (not shown), as are known in the art. Computing nodes 22 are interconnected by a network 24, such as an InfiniBand™ or Ethernet switch fabric. Network 24 comprises leaf switches 26, at the edge of the network, which connect directly computing nodes 22, and spine switches 28, through which the leaf switches are interconnected. The leaf and spine switches are connected by links (shown in the figures that follow) in a fat-tree topology, as defined above.

A network manager 29 controls aspects of the operation of switches 26 and 28, such as routing of messages through network 24 and, for the purposes of embodiments of the present invention, selection of the switches and links that are to be activated or deactivated for purposes of power saving. Manager 29 may be implemented as a dedicated processor, with memory and suitable interfaces, for carrying out the functions that are described herein in a centralized fashion. This processor may reside in one (or more) of computing nodes 22, or it may reside in a dedicated management unit. Alternatively or additionally, although manager 29 is shown in FIG. 1, for the sake of simplicity, as a single block within network 24, some or all of the functions of this manager may be carried out by distributed processing and control among switches 26, 28 and/or other elements of system 20. The term "network manager," as used herein, should therefore be understood to refer to a functional entity, which may reside in a single physical entity or be distributed among multiple physical entities.

Power Reduction in K-Ary N-Tree Networks

Figure 2:
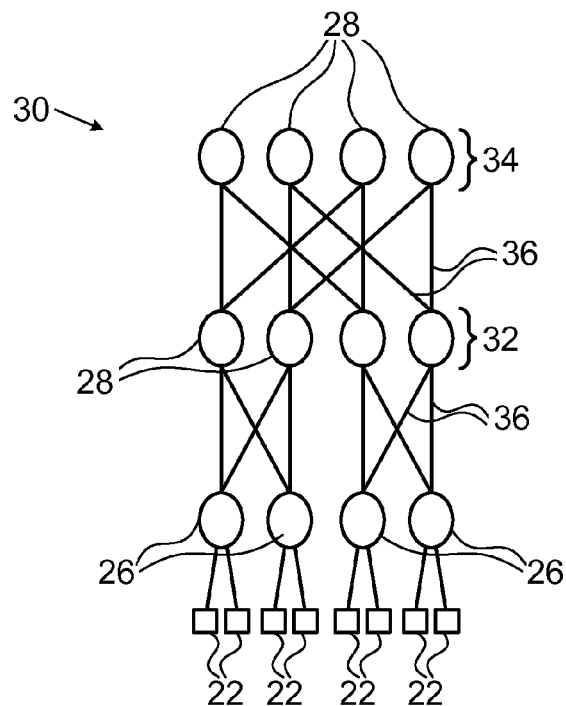
FIG. 2 is a graph that schematically illustrates a network in which a power reduction scheme is implemented in accordance with an embodiment of the present invention.

FIG. 2 is a graph that schematically illustrates a k-ary n-tree network 30 in which a power reduction scheme is implemented in accordance with an embodiment of the present invention. An n-tree network is a fat-tree network with a hierarchy of n levels of switches. In a k-ary network, each switch has k links to nodes (switches or computing nodes) in the level below it and (in all levels but the highest one) k links to switches in the level above it. Thus, a k-ary n-tree contains $nk^{n-1}$ k×k switches and serves $k^n$ computing nodes.

Network 30 in FIG. 2 is a 2-ary 3-tree network, with spine switches 28 arranged in an intermediate level 32 and an upper (highest) level 34. Switches 26 and 28 are interconnected by links 36, all of which are assumed, for the sake of simplicity, to have the same bandwidth. Each of leaf switches 26 is connected to two computing nodes (omitted from subsequent figures for the sake of simplicity). Although this and the other pictured examples relate to networks with small values of k and n, the principles of these embodiments are equally applicable to networks of much larger scale.

Figure 3A:
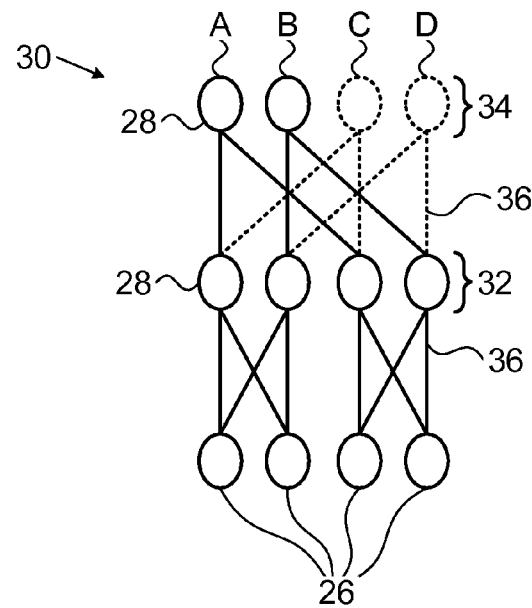
FIGS. 3A and 3B are graphs that schematically show the network of FIG. 2 in two different power saving configurations.
Figure 3B:
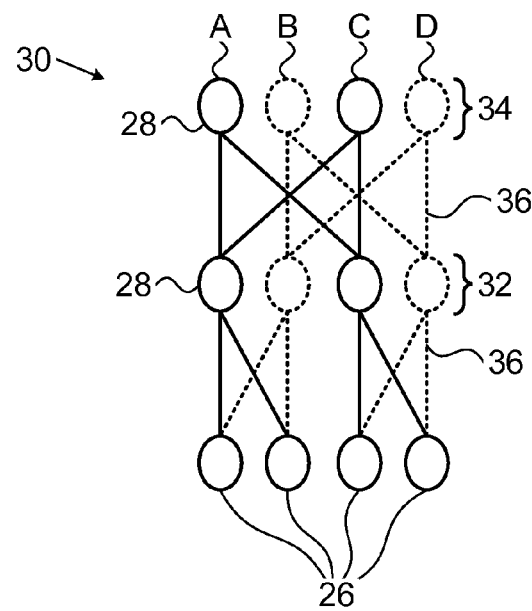

FIGS. 3A and 3B are graphs that schematically show network 30 in two different power saving configurations. In both figures, it is assumed that network conditions are such that the full bandwidth availability is not required. For example, it may be that traffic has dropped to roughly half of full load or that the network is heavily over-provisioned (relative to the actual bandwidth requirements or to the bandwidth provided by an applicable service level agreement), so that the computing nodes require or are entitled to only half the bandwidth capacity of the network. On the other hand, all of the computing nodes may be operational, meaning that leaf switches 26 remain active and may require full connectivity to all other leaf switches. Under these conditions, it would be desirable to deactivate half of the spine switches 28 and associated links 36 in the network, while still maintaining connectivity between all of the leaf switches.

In FIG. 3A, the spine switches 28 labeled c and d in upper level 34 are deactivated, along with links 36 connecting to these spine switches. Because of the k-ary n-tree topology, however, the remaining active spine switches 28 in level 34, labeled a and b, each connect to different spine switches 28 in level 32. It is therefore not possible to deactivate any of the spine switches in level 32 without sacrificing the desired connectivity and/or bandwidth of the network.

The configuration of FIG. 3B, in which spine switches b and d in upper level 34 are deactivated, is superior in this regard. In this case, the deactivated state of the switches in level 34 can be propagated down to level 32, since switches b and d both connect to the same switches in level 32. Thus, half the spine switches in each of levels 32 and 34 are deactivated, along with the corresponding links 36, while maintaining full connectivity between all of leaf switches 26. The network bandwidth is equal roughly to half the maximum available bandwidth in the network.

Figure 4:
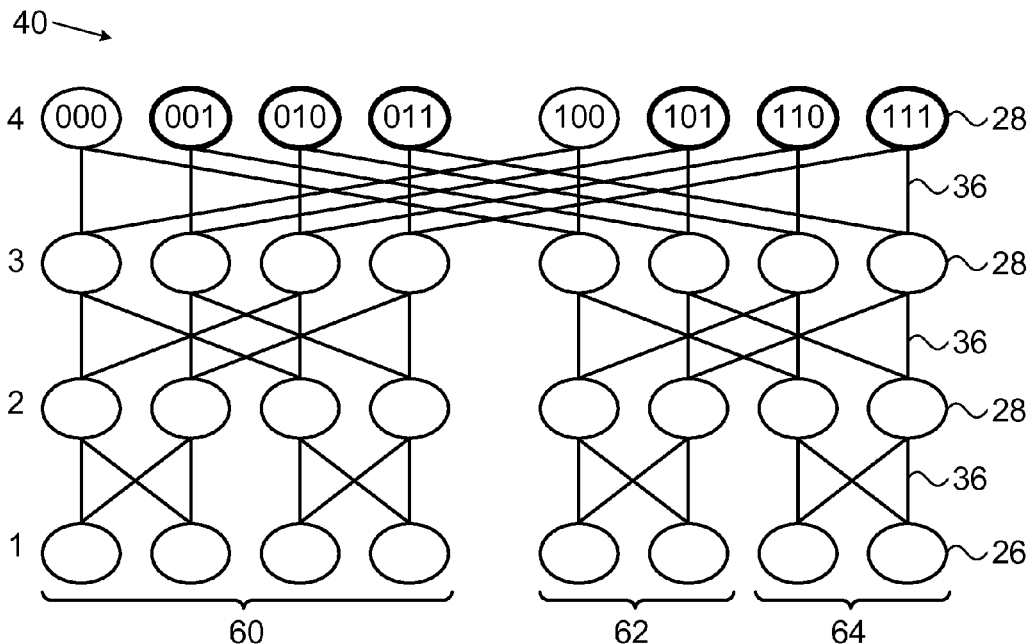
FIG. 4 is a graph that schematically illustrates another network in which a power reduction scheme is implemented in accordance with an embodiment of the present invention.

FIG. 4 is a graph that schematically illustrates a network 40, in which a power reduction scheme is implemented in accordance with an embodiment of the present invention. Network 40, a 2-ary 4-tree, will be used to illustrate a formal algorithm for selecting the spine switches 28 to deactivate in low-power states of the network. The principles of this algorithm may be extended in a straightforward way to networks having more than four levels, as well as networks in which the switches have arity of three or more.

The levels of network 40 are indexed from 1 to n, wherein 1 refers to leaf switches 26, and n refers to the highest level of spine switches 28. The binary value of i (for $0 \leq i \leq 2^{n-1}-1$) denotes the i-th switch in each level. Thus, for example, (3,001) refers to the second switch from the left in the third level of the network.

If a given spine switch in an intermediate level of the network is active, then to maintain connectivity, all of the spine switches to which the given switch is connected in the next-higher level should be active, as well. For this reason, it is desirable that switches (4,000) and (4,100) be active together, since they are connected to the same pair of switches in the third level: (3,000) and (3,100). The switches in the fourth level may be grouped in pairs that share this characteristic: For each pair of switches whose indices differ only in the most significant bit (MSB), there is a corresponding pair of switches in the third level to which they both connect.

Thus, when the network manager selects the subset of the upper-level switches that are to be active, it adds the two switches in each pair to the subset in immediate succession (and likewise deactivates them in immediate succession when bandwidth requirements decrease). If traffic conditions indicate that only two spine switches need to be active in the highest level of network 40, the network manager will choose two switches with different MSB but the same two LSB, i.e., a pair of switches that connect to the same switches in the next level down. If more active switches are required, the network manager will add them in pair order. Hence, to minimize the number of active spine switches in the third level, the network manager may activate the fourth-level switches in the following sequence: 000, 100, 001, 101, 010, 110, 011, 111. The ordering of the pairs in this sequence is arbitrary, and any of the spine switches may be chosen as the starting pair.

In order to minimize the number of active spine switches in the second level, however, another constraint is imposed on the order of activation of pairs of switches in the fourth level: Two switches in the third level are connected to the same pair of switches in the second level if their indices differ in the second bit (second MSB). For instance, switches (3,000) and (3,010) are both connected to switches (2,000) and (2,010). Therefore, it is desirable that the network manager choose the order of fourth-level pairs to switches to activate so that the activation propagates down to pairs of switches in the third level that connect to the same switches in the second level.

For example, if the fourth-level switches (4,000) and (4,100) are initially activated, then switches (3,000) and (3,100) in the third level and (2,000), (2,010), (2,100), (2,110) in the second level will be activated, as well, for full connectivity. If switches (4,010) and (4,110) are now activated, two additional switches in the third level, (3,010) and (3,110), will also be activated, but no additional switches need be activated in the second level. Thus, the following order of activation of the spine switches in the fourth level will minimize the overall number of spine switches in network 40 that are activated: 000, 100, 010, 110, 001, 101, 011, 111. Other permutations of this order may also be used.

The above selection order for activation of the upper-level switches may be generalized as follows to operate as a mathematical progression over the indices of the switches in 2-ary n-tree networks for any n: In each of the n levels, the switches have indices of (n−1) bits. The network manager begins to activate the switches in the upper level of the network starting from an arbitrarily-chosen switch with the generalized binary index $(b_1, b_2, b_3, \ldots b_{n-2}, b_{n-1})$, wherein each $b_j$ represents a bit. The second switch to activate will be $(1-b_1, b_2, b_3, \ldots, b_{n-2}, b_{n-1})$. The next two switches to activate in the upper level will be $(b_1, 1-b_2, b_3, \ldots, b_{n-2}, b_{n-1})$ and $(1-b_1, 1-b_2, b_3, \ldots b_{n-2}, b_{n-1})$. The next four switch indices to activate can be calculated from the previous four by flipping the third bit, i.e. $(b_1, b_2, 1-b_3, \ldots, b_{n-2}, b_{n-1})$, $(1-b_1, b_2, 1-b_3, \ldots, b_{n-2}, b_{n-1})$, $(b_1, 1-b_2, 1-b_3, \ldots, b_{n-1}, b_{n-1})$ and $(1-b_1, 1-b_2, 1-b_3, \ldots, b_{n-2}, b_{n-1})$. This selection order continue in the same way until all of the $2^{n-1}$ switches are active.

For instance, in a 2-ary network with n=6 levels, the order of activation of the upper-level spine switches will be the following:

00000, 10000, 01000, 11000, 00100, 10100, 01100, 11100,
00010, 10010, 01010, 11010, 00110, 10110, 01110, 11110, 00001,10001,01001,11001,00101,10101,01101,11101,
00011,10011,01011,11011,00111,10111,01111,11111

The selection order can be calculated formally using the algorithm listed below:

---

LISTING 1 - SELECTION ORDER FOR SWITCH ACTIVATION

```
find_nodes (first_node = (b_1, b_2, b_3, ..., b_{n-2}, b_{n-1}),
    requested_nodes) {
        nodes = 0
        i = 0
        L = {}
        L = L U {first_node}
        nodes ++
        if (nodes == requested_nodes) {
            return L
        }
        do {
            for (j = 0; j < 2^i; j++) {
                next = L[j]
                next = flip_one_bit (next, i+1)
                L = L U {next}
                nodes++
                if (nodes == requested_nodes) {
                    return L
                }
            }
            i = i + 1
        } while (1)
    }
```

---

Figure 8A:
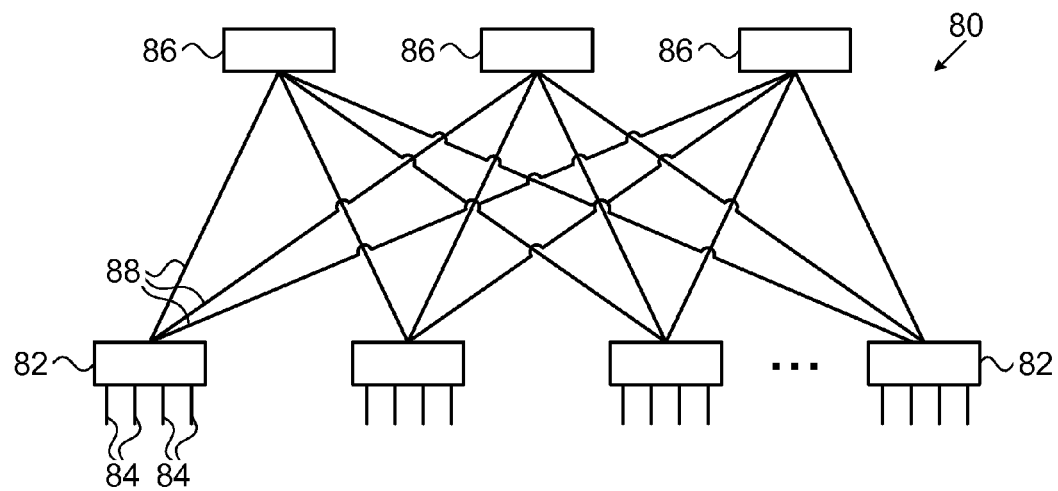
FIGS. 8A and 8B are block diagram that schematically illustrate components of a multi-level tree network, in accordance with an embodiment of the present invention.
Figure 8B:
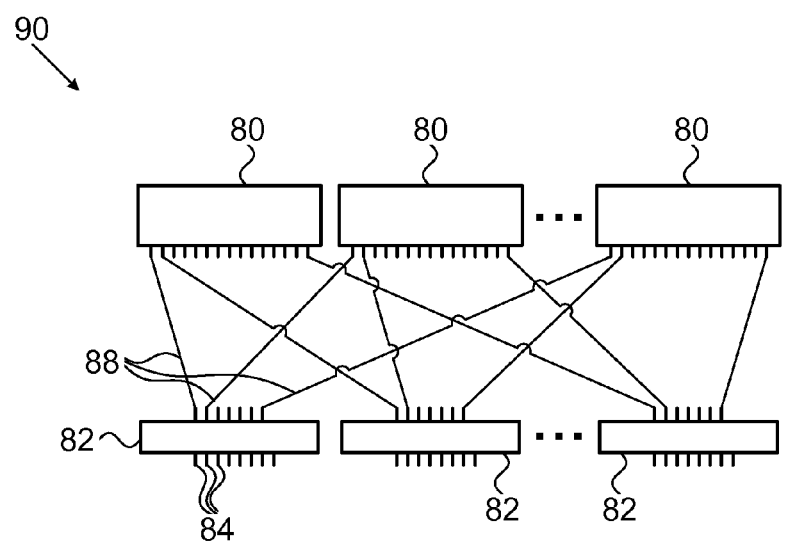

A generalized algorithm that can also be used for k>2 is presented below in Appendix A. Another type of fat-tree architecture is shown in FIGS. 8A and 8B, and the application of the principles of the present invention to the pictured architecture is described hereinbelow with reference to these figures.

Figure 5:
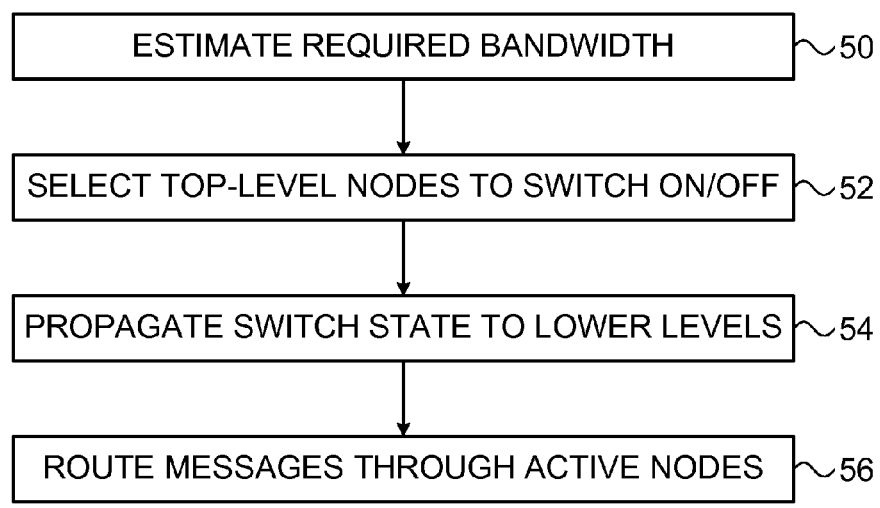
FIG. 5 is a flow chart that schematically illustrates a method for reducing power consumption in a network, in accordance with an embodiment of the present invention.

FIG. 5 is a flow chart that schematically illustrates a method for reducing power consumption in a network, summarizing key points of the foregoing description, in accordance with an embodiment of the present invention. Network manager 29 assesses network conditions and requirements, such as the estimated bandwidth requirement for a certain time period, at a requirement estimation step 50. The bandwidth may be estimated on the basis of current or expected traffic conditions, using any suitable forecasting criteria and/or algorithm. Based on this estimate, the manager decides how many of the upper-level spine switches (top-level nodes in the network) should be active during the period in question.

One way to forecast the required bandwidth is on the basis of deterministic scheduling, as described in greater detail hereinbelow. In this case, the required (minimal) number of active spine switches is known in advance.

Alternatively, when such precise forecasting is not possible, the switches may count and report the amount of traffic that they carry, using performance counters on each port, for example. The network manager may then compare the reported traffic to local and global thresholds in order to decide whether to activate or deactivate additional spine switches. For instance, if the traffic load in a given spine switch exceeds a (high) local threshold, the network manager may decide to switch on another nearby spine switch. Similarly, if the traffic load is lower than a second, lower threshold, the manager may decide to deactivate the spine switch and route traffic around it. To avoid repeated rerouting, this traffic may be rerouted through spine switches with relatively high traffic loads, rather than through low-traffic spine switches that are likely to be deactivated in the next future.

Global thresholds may define, as a function of the current number of working spine switches, the total traffic volume above which another upper-level spine switch will be activated (if any still remain inactive). By the same token, if the total traffic is lower than another threshold, one or more of the active spine switches may be deactivated.

Whatever criteria are used to determine the desired number of active upper-level spine switches, network manager 29 selects the switches to activate, at an upper-level selection step 52. The selection follows a predetermined selection order, as explained above. This order is typically chosen so as to minimize the number of intermediate-level spine switches that will need to be active in order to maintain the required bandwidth and connectivity between the leaf switches. Deactivating a spine switch means that the links connected to the spine switch are deactivated, as well.

Once the network manager has selected the upper-level spine switches that are going to be active, it propagates the selection downward to the intermediate levels of the network, at a switch-state propagation step 54. Typically, the intermediate-level switches that are connected to an active switch in the next-higher level are activated, while the remaining intermediate-level switches are deactivated.

Once all the active spine switches have been chosen, network manager 29 powers down the inactive switches, along with the inactive links that connect to them. The network manager (or the active switches themselves) computes routes for communication traffic between the leaf switches via the active spine switches, at a routing step 56. Alternatively, the routes may be computed and implemented before powering down the inactive switches and links in order to reduce the likelihood of traffic loss. Messages between the computing nodes that are connected to the leaf switches are then routed through the network accordingly.

Figure 6:
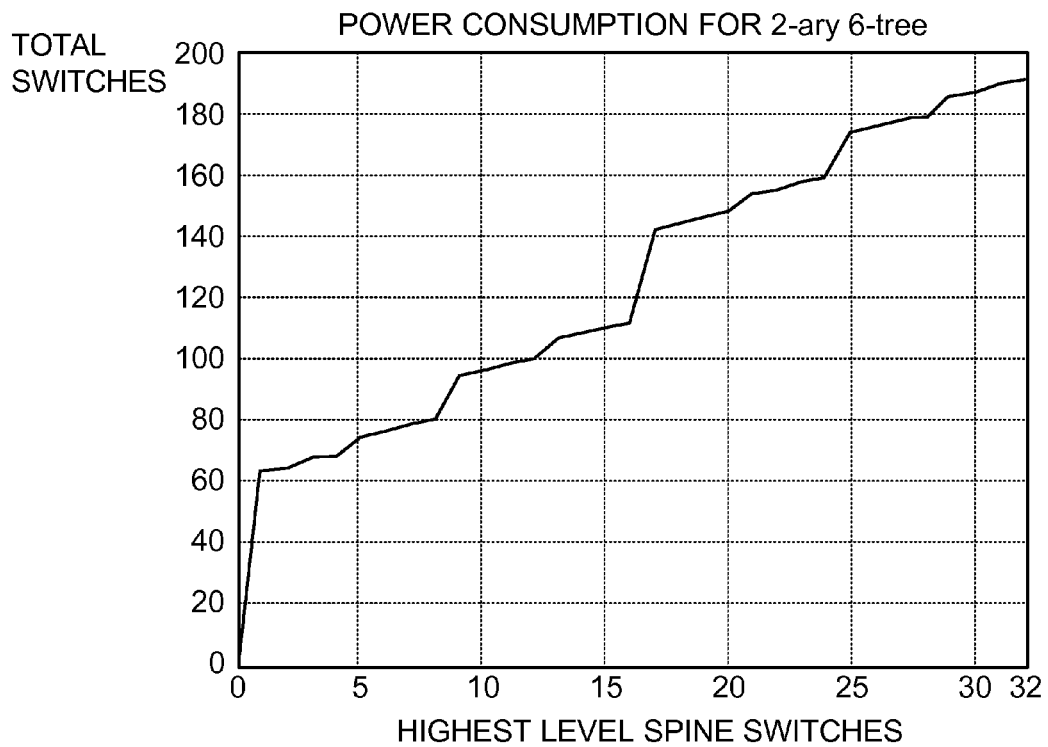
FIG. 6 is a plot that schematically illustrates the reduction of power consumption achieved by switching off spine switches in a network, in accordance with an embodiment of the present invention.

FIG. 6 is a plot that schematically illustrates the reduction of power consumption that is achieved by switching off upper-level spine switches in a network, in accordance with an embodiment of the present invention. This plot is based on a simulation of the performance of a 2-ary 6-tree, which has thirty-two switches in each level, assuming that all switches consume the same amount of power. As the number of active highest-level spine switches is reduced, the total number of active switches drops with sub-linear slope. Thus, when only one upper-level switch is active, the power consumption finally reaches a minimum level of about ⅓ of the maximal power consumption.

By the same token, when the traffic demand increases, requiring greater bandwidth, the upper- and intermediate level spine switches are activated, increasing the power consumption accordingly.

Scheduling of Computing Jobs to Conserve Network Power

The methods described above have assumed no knowledge about specific traffic patterns between leaf switches 26, and have assumed that traffic traverses all levels of the fat-tree network. In some cases, however, when traffic is sent between leaf switches in the same neighborhood, the traffic does not have to climb the entire fat-tree and may be transferred only through spine switches in the lower levels.

For instance, in the 2-ary 4-tree network shown in FIG. 4, traffic may be sent between leaf switches (1,000) and (1,010) via the spine switches of the third level (and the switches in the fourth level could all be switched off). Similarly, to send traffic between leaf switches (1,000) and (1,001), only the two spine switches (2,000), (2,001) in the second level are required to provide connectivity (and even one of them could be sufficient at low traffic levels). On the other hand, traffic between leaf switches (1,000) and (1,100) will pass through spine switches in the fourth level.

In general, the number of levels that traffic between a given pair of leaf switches has to climb will depend on the size of the minimal sub-tree that contains the source and destination switches. In the indexing scheme that is shown in FIG. 4 and described above, the number of levels the traffic will have to climb can be represented as a function of the location of the first bit at which the binary indices of the leaf switches differ. For instance, if the indices differ in the first bit (such as between leaf switches (1,000) and (1,100)), spine switches in all the levels of the network will be traversed, whereas if they differ only in the last bit (such as (1,000) and (1,001)), the traffic will reach only spines in the second level.

Thus, in an embodiment of the present invention, network manager 29 assigns and schedules network activity so that heavy traffic is concentrated, when possible, between leaf switches that are close together. "Close" in this context means that the leaf switches are connected by spine switches in the lower levels of the network or, equivalently in the present scheme, that the difference between the indices of the leaf switches is small. Conversely, leaf switches between which only low traffic (or no traffic) is expected may be located far apart.

This sort of scheduling of network activity typically comes into play in assigning computing nodes 22 (FIG. 1) to carry out different distributed computing jobs. For example, referring to FIG. 4, if one job is assigned to computing nodes that are connected to a group 60 of leaf switches 26, while other jobs are assigned to groups 62 and 64, communications will be concentrated locally. In this case, it will be possible to turn off most or all of spine switches 28 in the upper level of network 40, as well as a number of the spine switches in the third level.

To systematically minimize traffic through the upper levels of a fat-tree network with $2^{n-1}$ leaf switches, the network manager may arrange the leaf switches in $2^{n-2}$ pairs, such that the mutual traffic expected between each pair of switches is high. The manager places the paired leaf switches in adjacent positions in the first level of the fat-tree. The manager then refers to each such pair of leaf switches as a new "mega-node," and calculates the total traffic between pairs of the $2^{n-2}$ mega-nodes as the sum of the traffic between the four constituent leaf switches. According to these total traffic values, the manager divides the mega-nodes into $2^{n-3}$ pairs with high mutual traffic, and so forth through larger mega-node groupings until only two mega-nodes are left. The manager node assigns the leaf switches to locations in the network according to the pair and mega-node groupings.

The network manager may apply any suitable matching algorithm in creating the pairs of leaf switches and mega-nodes. One class of algorithms that may be used for this purpose is the class of solutions to the well-known "stable roommates problem." Irving described a solution to this problem in "An Efficient Algorithm for the 'Stable Roommates' Problem," *Journal of Algorithms* 6:4, pages 577-595 (1985), which is incorporated herein by reference.

Network manager 29 may also use network power conservation as a factor in deciding when to run each computing job. In general, the manager will have a list of jobs and their expected running times. Some of the jobs may have specific time periods (epochs) when they should run, while others are more flexible. As a rule of thumb, to reduce overall power consumption, the manager may prefer to run as many jobs as possible at the same time, since the total power cost function is sub-linear in the number of working spine switches in the highest level of the network, as illustrated in FIG. 6. On the other hand, the manager may consider the relation between the estimated traffic load and the maximal capabilities of a given set of spine switches, and if running a given job at a certain time will lead to an increase in the required number of active spine switches, the manager may choose to schedule the job at a different time.

Thus, in general, after assigning all the jobs that must run during specific epochs, the manager will try to choose the epochs in which to run the remaining jobs so as to minimize the total power cost C(x) summed over all the epochs (wherein x is the number of active upper-level spine switches). As an example, let us assume that during a given epoch $t_1$ a single upper-level spine switch has been selected for activation, whereas during another epoch $t_2$ seven active upper-level spine switches have been selected, and a job that is to be scheduled will require two more upper-level spine switches to be activated. Referring to the power consumption plot in FIG. 6, the manager will prefer to schedule the job during $t_1$, due to the much larger jump that would occur in power consumption at $t_2$ in going from seven to nine active upper-level spine switches.

On the other hand, in scheduling computing jobs, manager 29 is typically concerned not only with minimizing power consumption, but also with minimizing the delay that a given job has to wait before execution. This latter objective may conflict with the goal of reducing power consumption. To balance these two concerns, manager 29 may use a weighted objective function, as described below.

For the purpose of computing the objective function, we assume that each job (such as job i) in an input list has the following parameters:

Expected length (in predefined time units), denoted by $L_i$.
Number of requested nodes, denoted by $N_i$.
Precedence priority (as a real value in the range [0,1]) denoted by $\alpha_i$.

We also assume a global factor for power consumption in the objective function, denoted by $\beta$. In some cases, it may be preferable to use a specific weight for each job, rather than a global one).

To determine job assignments, manager 29 will attempt to optimize (in this case, minimize) the following objective function:

$$F = \Sigma_i \{\alpha_i D_i\} + \beta P$$

Here P denotes the total power consumption, and $D_i$ is the delay that job i encounters. For the purpose of the optimization, the manager reviews the list of requested jobs and finds, for each job, the time and location that minimizes the term $\alpha_i D_i + \beta \Delta P$, wherein $\Delta P$ is the power addition according to the location of the job at a given time. At any given time, the manager attempts to assign each job to the computing nodes in such a way that the additional power consumption is minimized.

Since the order of the jobs on the list can be important, it may be advisable to run the above procedure several times using different ordering approaches, and then to choose the result which minimizes the objective function F. For example, the following ordering approaches may be used:

Descending order of job length
Descending number of nodes
Increasing number of nodes
Decreasing value of precedence priority
A random order based on the precedence priority.

The above heuristics can be expressed systematically by the algorithm listed below. In this listing, R denotes the number of ordering approaches, T is the total possible running period in a predetermined time unit, and J is the number of jobs.

---

LISTING 2 -POWER-AWARE SCHEDULING

```
Jobs schedule (jobs) {
    MinF_value = ∞
    Best_sorting_index = −1
    Suggested_scheduling = { }
    for ( r = 0; r < R; r ++) {
        jobs = Sort jobs according to ordering
                policy (jobs, r)
        for (i = 0; i < J; i++) {
            jobs [i].located = 0
            jobs [i].start_time = −1
        }
        for (i = 0; i < J; i++) {
            Job_cost = ∞
            Best_time = −1
            P_current = Calculate_Power(jobs)
            for (t = 0; t < T; t++) {
                D_i = t
                jobs[i].located = 1
                jobs[i].start_time = t
                P_possible = Calculate_Power(jobs)
                ΔP = P_possible − P_current
                jobs [i].located = 0
                jobs[i].start_time = −1
                if ((α_iD_i + βΔP) < Job_cost) {
                    Job_cost = (α_iD_i + βΔP)
                    Best_time = t
                }
            }
            jobs[i].located = 1
            jobs[i].start_time = Best_time
        }
        P = Calculate_Power(jobs)
        F_value = βp
        for (i = 0; i < J; i++) {
            F_value = F_value + α_i jobs[i].start_time
        }
        if (F_value < MinF_value ) {
            best_sorting_index = r
            suggested_scheduling = jobs
            MinF_value = F_value
        }
    }
    return Suggested_scheduling
}
```

---

The above algorithm could be applied as follows, for example, in network 40 of FIG. 4. We assume that J=3 jobs are requested, each with the same length of L=1 time unit. The first two jobs, denoted A and B, each require three nodes. The third job, C, requires two additional nodes. Jobs A and B may be assigned in the first time unit such that job A uses nodes 000, 001, and 010 in level 1, 000 and 010 in level 2, and 010 in level 3; while job B uses nodes 101, 110 and 111 in level 1, 101 and 111 in level 2, and 202 in level 3. To guarantee connectivity, both of these jobs use switches in the third level. For the sake of simplicity, we assume that the power consumed by a working switch is 1.

Now, job C, which requires two nodes, is to be scheduled. One option is to assign job C to the first time unit along with jobs A and B, so that $D_3=0$. The second option is to postpone it to be the single job in the second time unit, with $D_3=1$. The second option permits job C to be assigned to two adjacent nodes in the same quadrant of the first level, and thus requires for connectivity only one additional node in the second level, yielding a total additional power consumption of $\Delta P=3$. To assign job C in the first time unit, only nodes 011 and 100 are available in the first level. Because these nodes are in different halves of the first level at least one node in the highest level of the network must be used, giving a total of $\Delta P=5$. Of these two options, the first option will be preferred if $\alpha_3 \cdot 0 + \beta \cdot 5 < \alpha_3 \cdot 1 + \beta \cdot 3$, i.e. if $2\beta < \alpha_3$.

Figure 7:
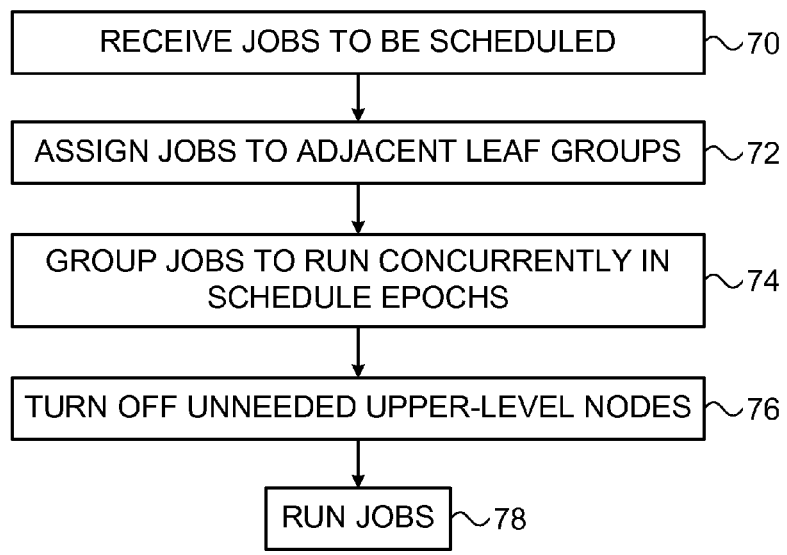
FIG. 7 is a flow chart that schematically illustrates a method for reducing power consumption in a computer network in conjunction with scheduling of computing jobs, in accordance with an embodiment of the present invention.

FIG. 7 is a flow chart that schematically illustrates a method for reducing power consumption in a fat-tree computer network in conjunction with scheduling of computing jobs, in accordance with an embodiment of the present invention. This flow chart summarizes key points of the techniques described above. Network manager 29 receives a list of computing jobs that are to be scheduled to run on computing nodes 22, at a job listing step 70. The manager groups the computing nodes according to the leaf switches 26 to which they are connected, and groups the leaf switches that are connected together via spine switches 28 in the lower and intermediate levels of the network. These leaf switches are considered to be close together, as defined above. The manager then assigns each job to run, whenever possible, on the computing nodes that are connected to one or more of these groups of close-by leaf switches, at a leaf grouping step 72.

The network manager schedules each job to run in a certain epoch or epochs, at a time scheduling step 74. As noted above, the epochs are chosen, whenever possible, to optimize the number of active spine switches and their utilization.

After having made the scheduling decisions and estimated the traffic that will be generated by each of the computing jobs, the network manager decides which of the upper-level and intermediate-level spine switches are needed during each epoch. Unneeded spine switches are deactivated, at a deactivation step 76. The computing nodes then run their assigned jobs, while communicating through the active spine switches, at an execution step 78. Spine switches are powered on when needed, based on scheduling decisions and/or demand for network service (e.g., bandwidth).

Routing Considerations

As noted earlier, changes in the active/inactive status of spine switches in the fat-tree network generally lead to changes in routing of messages through the network. Typically, the switches in the network maintain routing tables that indicate, for each destination address, the port through which the switch should forward messages to that address. The routing tables may be computed and updated by a centralized network manager, or they may alternatively be computed by a distributed management function, whereby each switch computes and updates its own routing table, as in Ethernet networks. (Ethernet switches in particular can be internally built as a "fat tree" of switch elements, in which case the internal routing can be computed inside the switch and programmed locally into all the switch elements.)

In order to reduce the stabilizing time of the routing tables and/or avoid packet loss following a change in switch status, the switches may exchange messages in preparation for a change in the active/inactive state of a spine switch. For instance, before switching off, a spine switch may send an update message to all of the other switches to which it is connected (and to the centralized network manager, if there is one), or the manager may send such a message to the switches. Upon receiving the message, the connected switches can make the necessary routing changes without having to detect the change in switch status themselves, and the exchange of other management packets may be reduced.

In some routing algorithms, a change in the active/inactive state of a spine switch can result in far-reaching changes in the routing tables of the other switches in the network. These changes incur considerable overhead in terms of computation and exchange of messages among the switches. To reduce this overhead, some embodiments of the present invention use adaptive routing, i.e., updated routing based on existing routing tables, with only a small number of changes concentrated mainly in the area of the current state change. The routing changes may then be localized within a single subnet, although in some cases they will have a wider effect. A cache-like memory (not shown) may be used to hold previous routings for similar network configurations, to be recalled and, possibly, reused in response to future changes.

Multi-Level Fat-Tree Networks

A multi-level fat-tree network may be divided into a number of modules, each containing a group of the switches extending over two or more levels. Each module comprises an internal tree, and the modules are externally arranged in the complete network in a tree topology. In some embodiments, switch activation and routing decisions within each module tree are managed internally within the module, while a central network manager is responsible for the decisions in the complete network. When a switch changes state in one of the modules, and rerouting is accomplished entirely within the module, the other modules and the central network manager need not be made aware of the change and do not have to recalculate their routing tables. In other cases, when local rerouting is not feasible (due to traffic loads, for example), the central network manager is notified of the change in switch state and may then calculate new routings that alter the total traffic transmitted through the affected module.

FIGS. 8A and 8B are block diagram that schematically illustrate components of a multi-level tree network 90, in accordance with an embodiment of the present invention. The basic building block in this network is a single-level switch 82 having a certain number of ports (including ports connecting to links 88), for example thirty-six ports.

A module 80 may be constructed from multiple, interconnected switches of this sort. In the example shown in FIG. 8A, module 80 is a 2-tree, having eighteen lower-level switches 82 connected by links 88 to nine upper-level switches 86 of the same thirty-six port type. Module 80 thus has 324 external ports 84. Other subnet module configurations may be similarly constructed, such as a module comprising three upper-level switches 86, six lower-level switches, and 108 external ports; or a module comprising eighteen upper-level and eighteen lower-level switches and providing 324 external ports to connect to the next level up in the hierarchy and another 324 external ports to connect to the next level down (which may be switches or computing nodes). In module 80, and typically in these alternative module configurations, as well, every lower-level switch 82 is connected by at least one link 88 to every one of upper-level switches 86.

Network 90 in FIG. 8B comprises, for example, an upper level comprising eighteen modules 80 with 108 ports each, which are connected by links 88 to 108 switches 82 in the lower level; or eighteen upper-level modules with 324 ports each, connected to 324 lower-level switches 82. This multi-level network is, in fact, a 3-tree, with the highest and intermediate levels contained inside modules 80. As another example, a 4-tree may be built from dual-level upper-level modules and dual-level lower-level modules. In these 3-tree (or 4-tree) networks, every one of the lower-level switches (or modules) is connected by at least one link to every one of the upper-level modules.

As a result of the structure of network 90 that is described above, each upper-level module 80 may be activated or deactivated as a unit without affecting the overall connectivity of the lower-level switches or modules and the processing nodes that are connected to them. This modular structure and operation provides a convenient basis for overall power reduction at the network level: For coarse bandwidth and power control (with granularity of 1/n, wherein n is the number of upper-level modules), modules 80 are activated or deactivated as a unit. Fine control may be provided by activating and deactivating a sub-group of one or more upper-level switches 86 within one of modules 80.

It may also be possible to deactivate certain lower-level switches or modules by taking into account the arrangement of switches 86 and 82 inside modules 80, as well as the connectivity considerations described in reference to the preceding embodiments. For example, in a 4-tree network comprising two levels of 2-tree modules 80, ports 84 of the lower-level switches in the upper level of the 2-tree modules may be connected to the ports of the upper-level switches in the lower level of modules as follows: The eighteen ports of the left-most module 80 in the upper level are connected to the left-most port of each of the eighteen left-most upper-level switches in the lower-level modules. These left-most ports all belong to the left-most switch 82 in the respective module, which is connected to all the switches in the other level of the module. Among the remaining modules 80 in the upper level of the network, there are seventeen other modules that are linked to the same left-most switch in each of the lower-level modules. The upper-level modules may thus be divided into eighteen disjoint groups, depending upon the upper-level switch in the lower-level modules to which they are linked. Based on this division, the upper-level modules may be activated and deactivated in group order, and the upper-level switches in the lower-level modules may then be activated and deactivated correspondingly in the same order. This arrangement minimizes the number of active switches in the second level in conjunction with the coarse bandwidth/power control mode described above.

Although the modular embodiments described above relate, for the sake of clarity, to certain particular numbers of levels, modules, switches and ports, the principles of these embodiments may similarly be applied in other modular, multi-level fat trees, having three, four, or more levels, with any suitable number and connectivity of components in each level.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

Node Selection for a General K-Ary N-Tree

The algorithm presented above in Listing 1 for a 2-ary n-tree can be extended to a more general k-ary n-tree for arbitrary k, as described below. For this purpose, each of the $k^{n-1}$ nodes in the i-th level (for $1 \leq i \leq n$) is represented by its ordinal value in base k, using (n−1) digits from $\{0, 1, \ldots, k\}$. For instance, in a 3-ary 3-tree, the $3^2=9$ nodes in each level can be represented by the values: 00, 01, 02, 10, 11, 12, 20, 21, 22.

On this basis, the generalized algorithm has the following form:

```
List find_nodes ( k, first_node = (b₁, b₂, b₃,...,b_{n-2},
        b_{n-1}), requested_nodes) {
    nodes = 0
    i = 0
    L = {}
    L = L U {first_node}
    nodes ++
    if (nodes == requested_nodes) {
        return L
    }
    do {
        for (t = 1; t < k; t++) {
            for (j = 0; j < kⁱ; j++) {
                next = L[j]
                next[i+1] = next[i+1] + t
                L = L U {next}
                nodes++
                if (nodes == requested_nodes) {
                    return L
                }
            }
        }
        i = i + 1
    } while (1)
}
```

The invention claimed is:

1. A method for communication, comprising:
    estimating a characteristic of communication traffic to be carried by a fat-tree network, which includes leaf switches interconnected by links with spine switches arranged in multiple levels, culminating in a highest level;
    responsively to the estimated characteristic, selecting, according to a predetermined selection order, a subset of the spine switches in the highest level to be active in carrying the communication traffic;
    in each of the levels of the spine switches below the highest level, selecting the spine switches to be active based on the selected spine switches in a next-higher level; and
    operating the network so as to convey the traffic between the leaf switches via the active spine switches, while the spine switches that are not selected remain inactive.

2. The method according to claim 1, wherein the selection order is determined so as to maximize a number of the spine switches in intermediate levels of the network that can be inactivated while still maintaining full connectivity between the leaf switches.

3. The method according to claim 1, wherein the network is a k-ary n-tree network, and wherein the selection order is determined such that the spine switches in the highest level that connect to a common spine switch in an intermediate level of the network are activated and deactivated in immediate succession.

4. The method according to claim 3, wherein the spine switches are identified by respective indices, and wherein the selection order is expressed as a mathematical progression over the indices.

5. The method according to claim 1, wherein estimating the characteristic of the communication traffic comprises scheduling computing jobs to be carried out by computing nodes connected to the leaf switches, and estimating characteristics of the communication traffic due to each of the computing jobs.

6. The method according to claim 5, wherein scheduling the jobs comprises determining the scheduling responsively to the selection order so as to reduce a power consumption of the network.

7. The method according to claim 1, wherein estimating the characteristic of the communication traffic comprises measuring a volume of the communication traffic carried by the network, and wherein selecting the subset of the spine switches comprises comparing the measured volume to a predetermined threshold in order to decide how many of the spine switches should be active.

8. The method according to claim 1, wherein estimating the characteristic of the communication traffic comprises detecting a change in the characteristic of the communication traffic, and wherein operating the network comprises changing an activity state of at least one of the spine switches responsively to the change.

9. The method according to claim 8, wherein operating the network comprises modifying a local routing of the communication traffic in a vicinity of the at least one of the spine switches responsively to the change.

10. The method according to claim 8, wherein operating the network comprises transmitting messages among the switches so as to modify a routing of the communication traffic with respect to the at least one of the spine switches prior to changing the activity state.

11. A method for communication, comprising:
    receiving computing jobs that are to be executed by a system that includes a plurality of computing nodes connected to leaf switches of a fat-tree network, in which the leaf switches are interconnected by links with spine switches;
    scheduling the jobs to run on respective groups of the computing nodes, wherein the groups are selected so as to enable one or more of the spine switches to be deactivated during execution of at least one of the jobs; and
    executing the jobs on the respective groups of the computing nodes while deactivating the one or more of the spine switches in accordance with the scheduling.

12. The method according to claim 11, wherein scheduling the jobs comprises selecting the groups so that two or more of the jobs run concurrently on different groups of the computing nodes, and the spine switches interconnecting the different groups can be deactivated during the execution of the two or more of the jobs.

13. The method according to claim 11, wherein scheduling the jobs comprises estimating expected mutual traffic between pairs of the leaf switches due to the jobs, and positioning the leaf switches in the fat-tree network responsively to the mutual traffic.

14. The method according to claim 13, wherein positioning the leaf switches comprises assigning the pairs of the leaf switches that have high mutual traffic to adjacent positions in the fat-tree network.

15. The method according to claim 11, wherein scheduling the jobs comprises assigning the computing jobs to run during respective epochs, wherein the epochs and the groups of the computing nodes are chosen so as to reduce an overall power consumption of the network due to the spine switches that are active.

16. The method according to claim 15, wherein assigning the computing jobs comprises optimizing an objective function that depends on the overall power consumption and on delays incurred in running the jobs.

17. Communication apparatus, comprising:
    a plurality of switches, comprising leaf switches and spine switches arranged in a fat-tree network, such that the leaf switches are interconnected by links with the spine switches arranged in multiple levels, culminating in a highest level; and a network manager, which is configured to select, according to a predetermined selection order and responsively to an estimated characteristic of communication traffic to be carried by the network, a subset of the spine switches in the highest level to be active in carrying the communication traffic, and in each of the levels of the spine switches below the highest level, to select the spine switches to be active based on the selected spine switches in a next-higher level, so as to cause the network to operate so as to convey the traffic between the leaf switches via the active spine switches, while the spine switches that are not selected remain inactive.

18. The apparatus according to claim 17, wherein the selection order is determined so as to maximize a number of the spine switches in intermediate levels of the network that can be inactivated while still maintaining full connectivity between the leaf switches.

19. The apparatus according to claim 17, wherein the network is a k-ary n-tree network, and wherein the selection order is determined such that the spine switches in the highest level that connect to a common spine switch in an intermediate level of the network are activated and deactivated in immediate succession.

20. The apparatus according to claim 19, wherein the spine switches are identified by respective indices, and wherein the selection order is expressed as a mathematical progression over the indices.

21. The apparatus according to claim 17, wherein the network manager is configured to schedule computing jobs to be carried out by computing nodes connected to the leaf switches, and to estimate characteristics of the communication traffic due to each of the computing jobs in order to select the spine switches that are to be active.

22. The apparatus according to claim 21, wherein the network manager is configured to schedule the jobs responsively to the selection order so as to reduce a power consumption of the network.

23. The apparatus according to claim 17, wherein the switches are configured to measure a volume of the communication traffic carried by the network, and wherein the network manager is configured to decide how many of the spine switches should be active by comparing the measured volume to a predetermined threshold.

24. The apparatus according to claim 17, wherein the network manager is configured to detect a change in the characteristic of the communication traffic, and to change an activity state of at least one of the spine switches responsively to the change.

25. The apparatus according to claim 24, wherein the switches are configured to modify a local routing of the communication traffic in a vicinity of the at least one of the spine switches responsively to the change.

26. The apparatus according to claim 24, wherein the switches are configured to transmit and receive messages so as to modify a routing of the communication traffic with respect to the at least one of the spine switches prior to changing the activity state.

27. Communication apparatus, comprising:

a computing system comprising a fat-tree network, which comprises leaf switches and spine switches interconnected by links, and a plurality of computing nodes connected to the leaf switches; and a network manager, which is configured to receive computing jobs that are to be executed by the computing system and to schedule the jobs to run on respective groups of the computing nodes, wherein the groups are selected so as to enable one or more of the spine switches to be deactivated during execution of at least one of the jobs, and to cause the jobs to be executed on the respective groups of the computing nodes as scheduled while deactivating the one or more of the spine switches.

28. The apparatus according to claim 27, wherein the network manager is configured to select the groups so that two or more of the jobs run concurrently on different groups of the computing nodes, and the spine switches interconnecting the different groups can be deactivated during the execution of the two or more of the jobs.

29. The apparatus according to claim 27, wherein the network manager is configured to estimate expected mutual traffic between pairs of the leaf switches due to the jobs, and to position the leaf switches in the fat-tree network responsively to the mutual traffic.

30. The apparatus according to claim 29, wherein the network manager is configured to assign the pairs of the leaf switches that have high mutual traffic to adjacent positions in the fat-tree network.

31. The apparatus according to claim 27, wherein the network manager is configured to assign the computing jobs to run during respective epochs, wherein the epochs and the groups of the computing nodes are chosen so as to minimize an overall energy consumption of the network due to the spine switches that are active.

32. The apparatus according to claim 31, wherein the network manager is configured to choose the epochs and the groups by optimizing an objective function that depends on the overall power consumption and on delays incurred in running the jobs.

* * * * *